(12) United States Patent
Hercher

(10) Patent No.: US 6,413,702 B1
(45) Date of Patent: Jul. 2, 2002

(54) METHOD FOR MAKING A HOLOGRAPHIC LINEAR POSITION ENCODER

(76) Inventor: Michael Hercher, 9 Stramsky Way, Marbelhead, MA (US) 01945

(*) Notice: Subject to any disclaimer, the term of this patent is extended or adjusted under 35 U.S.C. 154(b) by 36 days.

(21) Appl. No.: 09/603,981

(22) Filed: Jun. 27, 2000

(51) Int. Cl.[7] ................................................. G03H 1/04
(52) U.S. Cl. ............................ 430/321; 430/2; 430/1; 359/8; 359/14; 359/570
(58) Field of Search ............................ 359/8, 14, 570; 430/1, 2, 321

(56) References Cited

U.S. PATENT DOCUMENTS 4,802,719 A * 2/1989 Magarinos et al. ........... 351/44
5,059,499 A * 10/1991 Teitel ............................. 430/1

FOREIGN PATENT DOCUMENTS

GB 2189044 * 10/1987 ..................... 359/8
JP 09-005509 * 1/1997 .................. 430/321

OTHER PUBLICATIONS

Sugden, K. et al., "Chirped gratings produced in photosensitive optical fibers by deformation during exposure", Electron. Lett., vol. 30(5) pp. 440–442 (03/1994).*

Anon, 'Interferometrically manufactured holographic diffraction gratings', Research Disclosures vol. 102, pp. 32–33 (10/1972).*

Supertzi et al., 'Wide–angle Holography' J. Opt. Soc. Am., vol. 56(4) pp. 524–525.*

* cited by examiner

Primary Examiner—Martin Angebranndt
(74) Attorney, Agent, or Firm—Mark P. White

(57) ABSTRACT

A method for fabricating an error-free linear position encoder incorporates the generation of fringes on a holographic plate by the interference of light from two point sources. The fringes are projected onto a curved holographic plate without intervening optical elements, the curve being such that the fringes have a constant pitch along the surface of the plate. A methodology for generating such a curve includes the creation of a graphic representation of the hyperbolic fringes generated by the interference between two coherent point sources, which would fall on an appropriately curved holographic plate. A numerical technique derived from the graphic representation produces a "constant-pitch" curve such that all of the fringes projected onto the curve are equidistant. The holographic plate, coated with a photosensitive material, is fabricated or formed in the shape of the constant-pitch curve. After the plate is exposed to the interference fringe pattern, the plate is processed to produce a corresponding amplitude or phase structure on the plate. The plate is then flattened and used either as a precise linear encoder, or as a master from which precise linear encoders may be replicated.

5 Claims, 8 Drawing Sheets

METHOD FOR MAKING A HOLOGRAPHIC LINEAR POSITION ENCODER

BACKGROUND OF THE INVENTION

1. Field of the Invention

The present invention relates to the manufacture of linear position encoders, and more particularly to a low-cost method of manufacture which avoids the use of collimating optics.

2. Description Relative to the Prior Art

Position encoders are used in a variety of position measuring equipment. Such encoders contain a large number of closely-spaced rulings parallel to each other.

An error-free linear encoder is an encoder in which the pitch, or spacing between rulings, in constant from end to end. In the past, such encoders were either ruled in the same manner that diffraction gratings were ruled, or produced lithographically by reducing a large-scale drawing of the encoder and using a step-and-repeat process to make a long encoder. U.S. Pat. No. 4,219,933 is an example of the ruling approach. The use of lithography in forming diffraction gratings is described by Akedo et al., *Formation of a Diffractional Grating by Magnetic Lithograph*, Nippon Oyo Jiki Gakkaishi, vol. 13, No. 2, 1989.

More recently, holography has offered an attractive alternative as a technique for making uniform encoders. In this technique, light from two coherent point sources is collimated and the resulting beams are made to overlap in the region where the holographic encoder is to be exposed. FIG. 1 depicts an apparatus used in the holographic approach. Referring to FIG. 1, two coherent light sources 2, 4 radiate light cones 6,8 which are reflected off collimating mirrors, which create an overlapping region 14 in which interference fringes are produced. A hologram plate 16 is disposed within the area of the fringes.

When the interference fringe pattern is generated, a series of bright bands appears where the two beams constructively interfere, and alternate dark bands where they destructively interfere. The pattern is generated in this way in the plane of the hologram plate, which may be a photographic plate, or other photosensitive surface. In the case of a photographic plate, the exposed emulsion is then fixed and hardened in an acid bath. Further processing involves a prewash, followed by a hypoclearing, a wash in filtered water, and a final methanol bath before drying. U.S. Pat. No. 4,265,534 describes a process of this type in detail.

The holographic approach offers a number of advantages. First, this method produces an encoder in which high-spatial-frequency errors are absent. Once the setup is in place, this method allows for the rapid replication of encoders, one after another, with relative ease. By use of this method, it is relatively easy to produce an encoder with a pitch on the order of a wavelength. When using this method, a "fringe locker" can be used to stabilize the interference fringes for long exposures. The fringe locker is well known in the art, being a fringe stabilization system that views a part of the fringe pattern (above or below the hologram plate) and which electronically controls the relative phases of the two point sources so that the fringes remain locked in position—thus compensating for air turbulence, vibrations, etc. that might otherwise move the fringe pattern.

A major disadvantage of this standard holographic approach, however, is the requirement for collimating optics whose diameters are on the order of the length of the desired encoder, and which require tight control of spherical aberration in order to maintain a uniform pitch over the entire length of the encoder. In the case of encoders in the order of one meter, the optics can be extremely expensive to produce.

The current invention provides a means for producing encoders of a uniform pitch, providing the advantages of the holographic method, without the need for the expensive collimating optics.

BRIEF DESCRIPTION OF THE DRAWINGS

These, and further features of the invention, may be better understood with reference to the accompanying specification and drawings depicting the preferred embodiment, in which.

SUMMARY OF THE INVENTION

Figure 1:
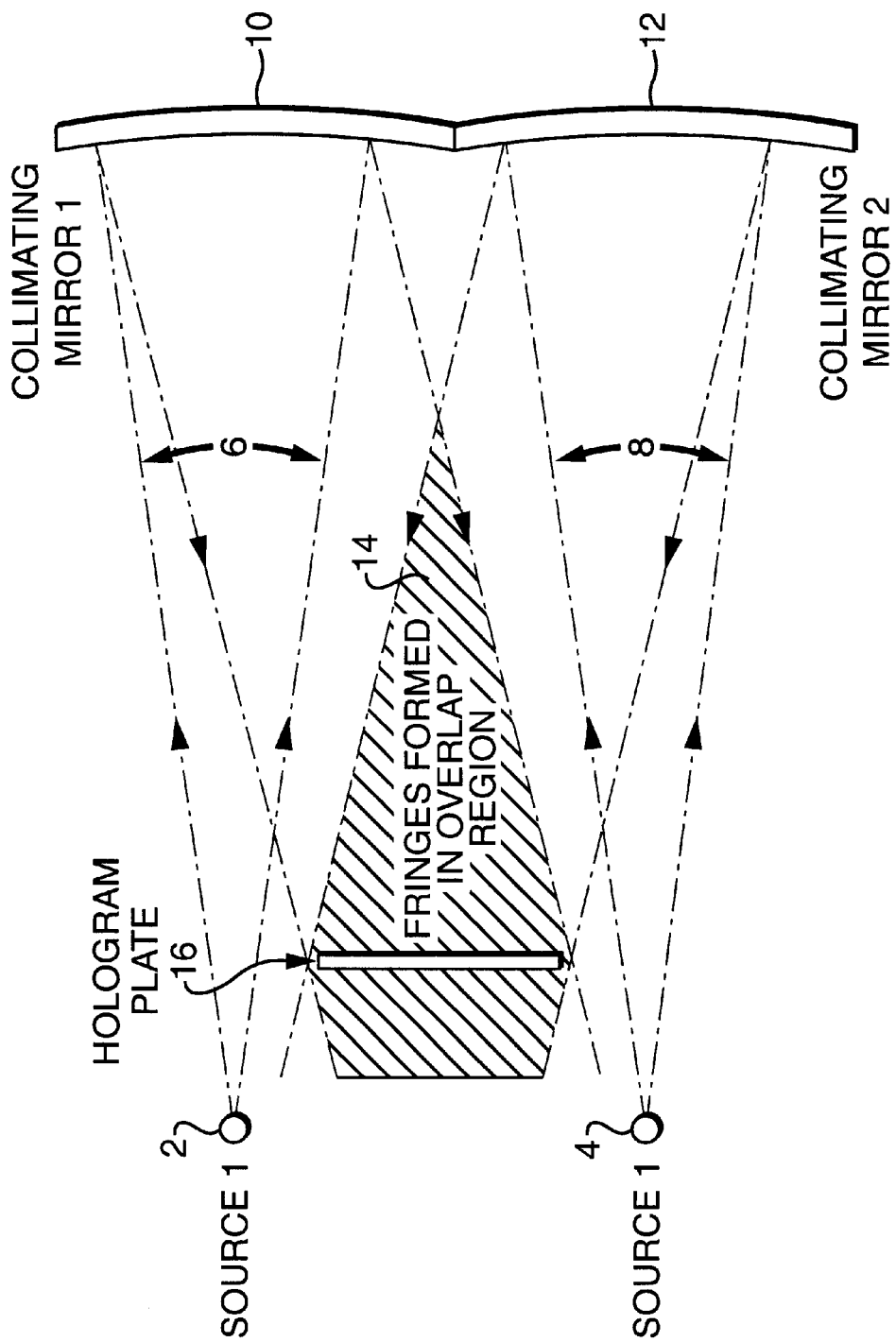
FIG. 1 depicts the apparatus for producing a Holographic Encoder using Collimating Optics.

A general object of the current invention to provide a method for producing an error-free linear encoder on the order of 20 to 40 inches in length It is a specific object of this invention to provide such a method which is inexpensive, and allows easy, rapid production of the encoders. It is a further specific object of this invention to provide such a method which uses holographic production methods, but does not require collimating optics.

According to one aspect of the current invention, a method for making a constant-pitch encoder involves a number of steps, beginning with the generating of a mathematical representation of the family of hyperbolic fringes which appear on a plane located a distance d from the midpoint of two coherent point sources a distance p from each other, the representation having an X axis and a Y axis. Next, a constant-pitch curve is calculated, lying in the plane and having a desired size on which the hyperbolic fringes appear equidistant, the curve intersecting a line normal to the plane containing the point sources and midway between the point sources at a distance d from said midpoint. Following this a holographic plate is calculated, the plate having a superior and inferior side, and in which the inferior side has the shape of the constant-pitch curve. The holographic plate is then coated with photosensitive material, and the plate is disposed at a distance d from two coherent point sources a distance p from each other, so that the inferior surface of the plate faces the point sources, and intersects a line normal to the plane containing the point sources and midway between the point sources at a distance d from the midpoint. The holographic plate is next illuminated with the interference fringes produced by the point sources, and then processed to produce grooves in the plate corresponding to the fringes. Finally, the plate is flattened.

According to a second aspect of the invention, the calculating of the constant-pitch curve further entails establishing a desired fringe spacing d, and then selecting a point f0 on the Y axis where the distance between the fringes, when projected onto the X axis, is a small amount less than d. A point on the next adjacent fringe fn is selected such that the distance fn−fd is equal to d. This process is repeated with each successive fringe, so that, for the nth fringe, a point on the next adjacent fringe, fn+1, is selected such that the distance, fn+1−fn, is equal to d. The process is repeated until either the curve is the desired size, or until there are no more fringes on which to repeat the process.

According to a third aspect of the invention, the holographic plate is made from glass.

According to a fourth aspect of the invention, the holographic plate is a master plate, and replicas are fabricated from the master plate by means of replication.

According to a final aspect of the invention, the replicas are fabricated from either glass, metal, fused silica, Zerodur or Invar.

DETAILED DESCRIPTION OF THE PREFERRED EMBODIMENTS

It is well known that two coherent point sources will produce interference fringes which are hyperbolic in shape. When interference from two point sources occurs, bright fringes are formed on surfaces which are the loci of points for which:

$$R_1 - R_2 = ml, \quad (1)$$

Where $R_1$ and $R_2$ where the distances from the point on the surface to each of the two point sources, 1 is the wavelength of the light, and m is an integer—the order of interference. Each surface of this type is a hyperboloid of revolution about an axis formed by the line joining the two point sources. These hyperboloids intersect a plane containing the two point sources in a series of hyperbolae given by:

$$(x/a)^2 - (y/b)^2 = 1, \quad (2)$$

Where, if 2A is the separation between the two point sources (located symmetrically on the x-axis), $a = ml/2$ and $b = \sqrt{(A^2 - a^2)}$.

Thus, if a planar holographic plate is disposed parallel to a plane containing the two coherent point sources, the fringes which appear in the plane of such a plate will be along the intersections of the hyperboloids given by equation(2) and the surface of the plate.

Figure 2A:
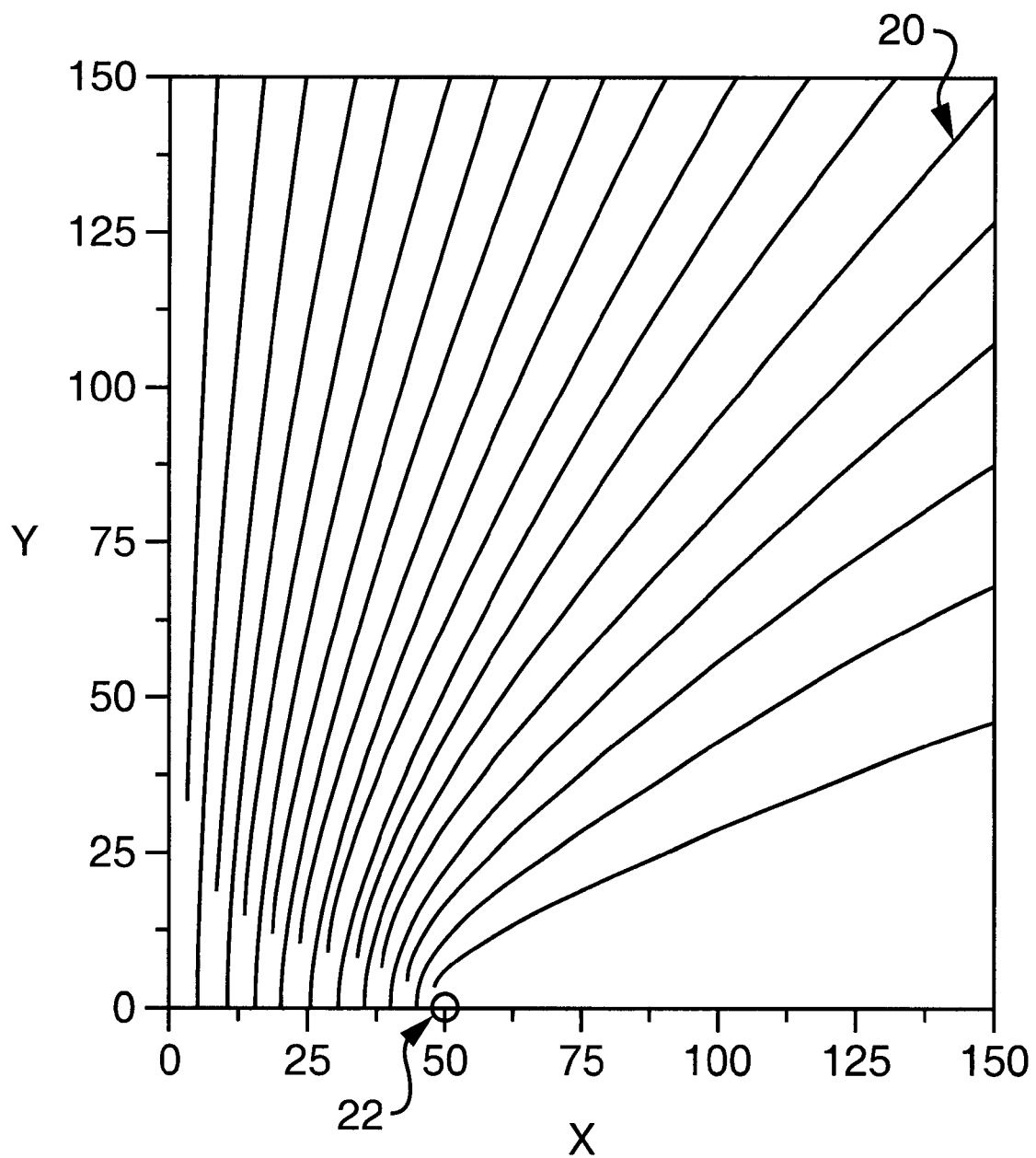
FIG. 2a depicts the Hyperbolic Fringes generated from 2 Point Sources in one quadrant only, showing their positions with respect to a positive x and y axis.

FIG. 2a shows these hyperbolae for a pair of point sources that are 20 wavelengths apart. Referring now to FIG. 2a, the X and Y axes represent displacements in units of wavelengths.

FIG. 2a shows only one quadrant, the first, or positive X,Y quadrant. To show the hyperbolae in all four quadrants, the figure must be reflected about the X and Y axes to show the entire fringe pattern. Referring to FIG. 2a, The point sources are at (−50,0) and (50,0), and the wavelength is 5. The fringes intersect the X-axis at intervals of ½ wavelength. Still referring to FIG. 2a, the point sources 22 generate a family of hyperbolic fringes, with typical fringe 20.

Figure 2B:
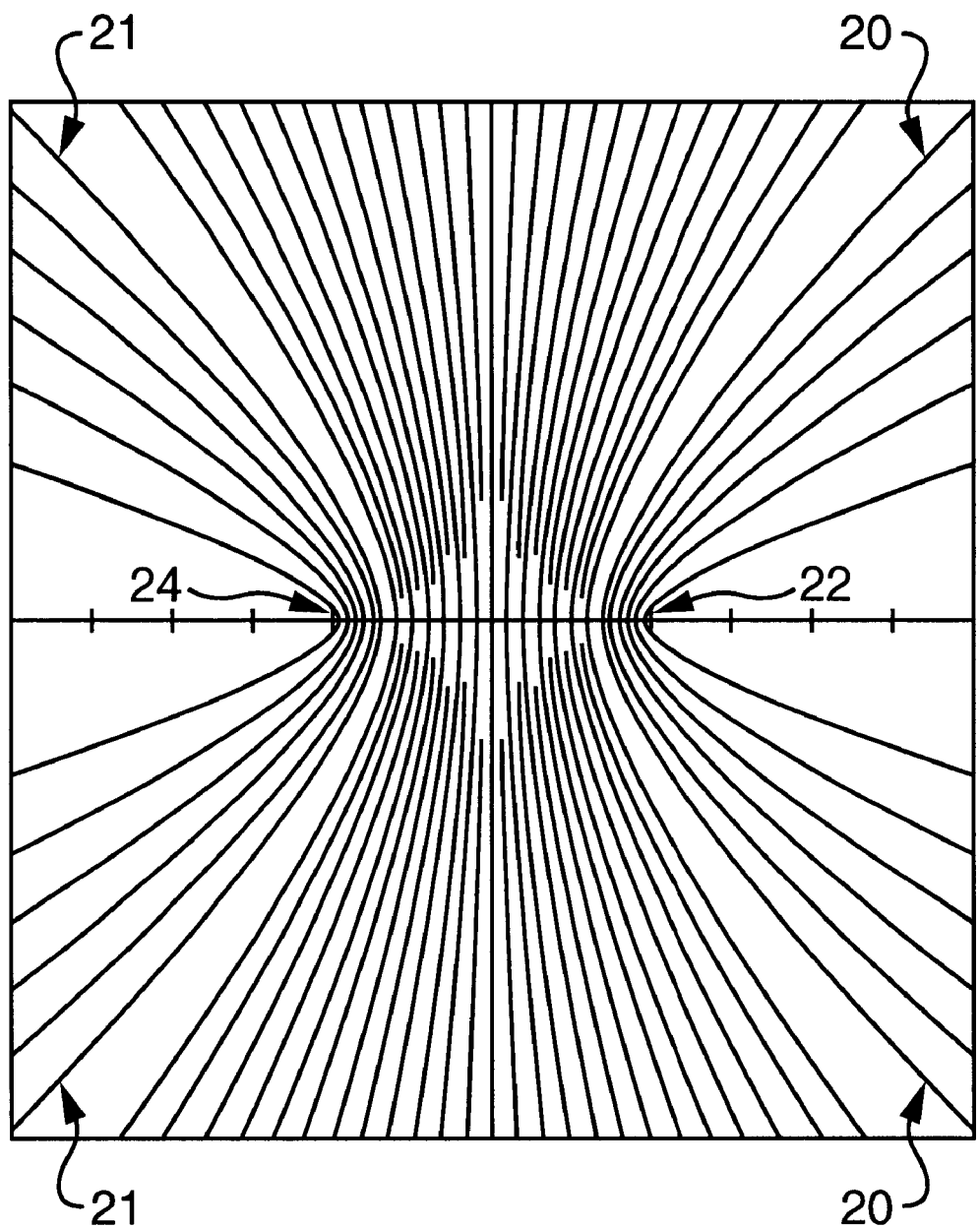
FIG. 2b depicts the Hyperbolic Fringes generated from 2 Point Sources in all four quadrants showing their positions with respect to a positive and negative x and y axis.

FIG. 2b shows the fringes in all four quadrants. The hyperbola in which curve 20 is included has a branch in the negative x axis as well, depicted in FIG. 2b as reference number 21. The point sources 22,24 generate the fringes of FIG. 2b.

If, however, the holographic plate is not planar, but rather curved, it is possible to generate a curve such that the fringes appearing on the plate are equidistant from each other.

The approach of the current invention for making an error-free encoder without collimating optics is to find a smooth curve which, when overlaid on FIG. 2a, intersects the fringes, which appear as a family of hyperbolae, at equal intervals along the curve. This curve will be referred to hereafter as the constant-pitch curve. The intervals are referred to as the pitch of the encoder.

Figure 6:
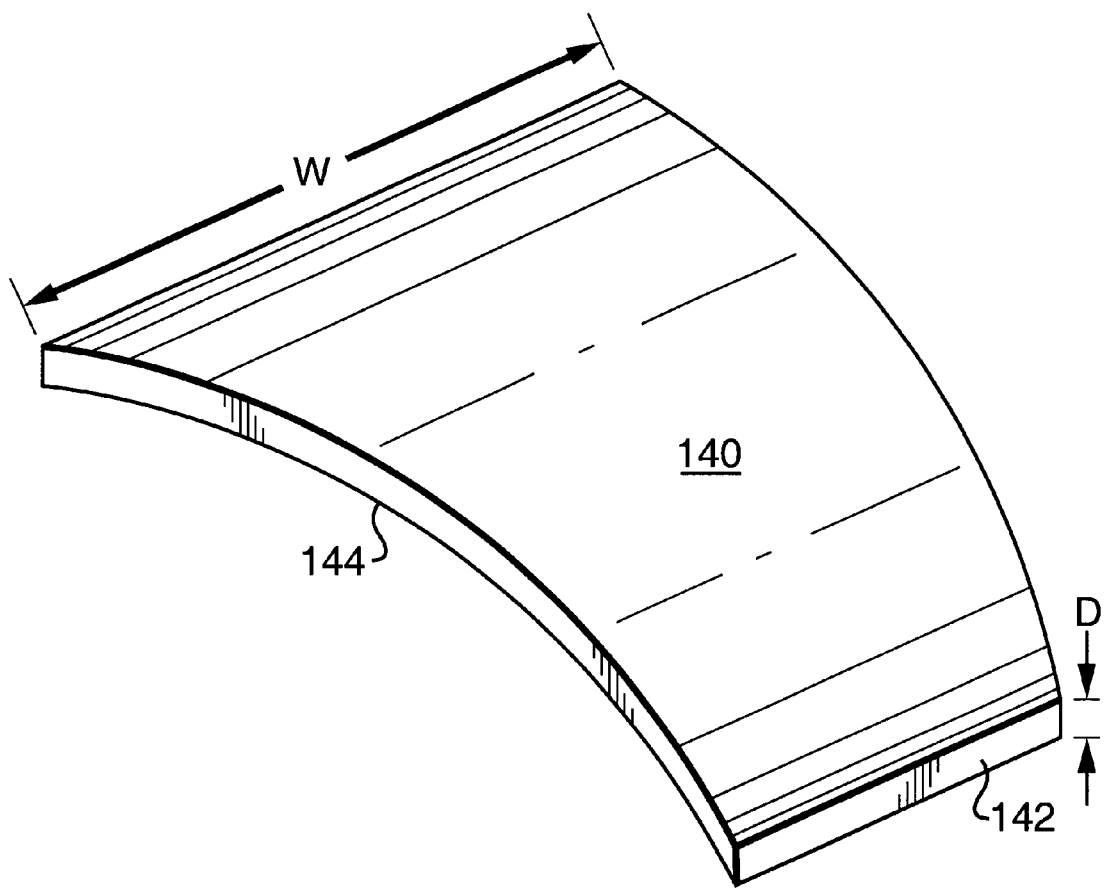
FIG. 6 depicts a perspective view of the curved holographic plate.

Referring now to FIG. 6, the holographic plate 140 must be then fabricated as a cylinder having a cross section in the shape of this constant-pitch curve 144, and having a constant width w. Practically speaking the cross section is not a curved line, but also has a thickness d [142]. From a mathematical standpoint, however, it will be treated in the following discussion as if it were a curved line, with the understanding that this line is in fact the intersection of the inner face 144 with a plane normal to the depth of the cylinder.

Although an exact, analytic solution to the problem of generating the constant-pitch curve has not yet been defined, I have developed a numerical technique for generating families of such curves. This numerical solution can be approximated by a polynomial equation and is described with the help of the block diagram of FIG. 7.

Figure 7:
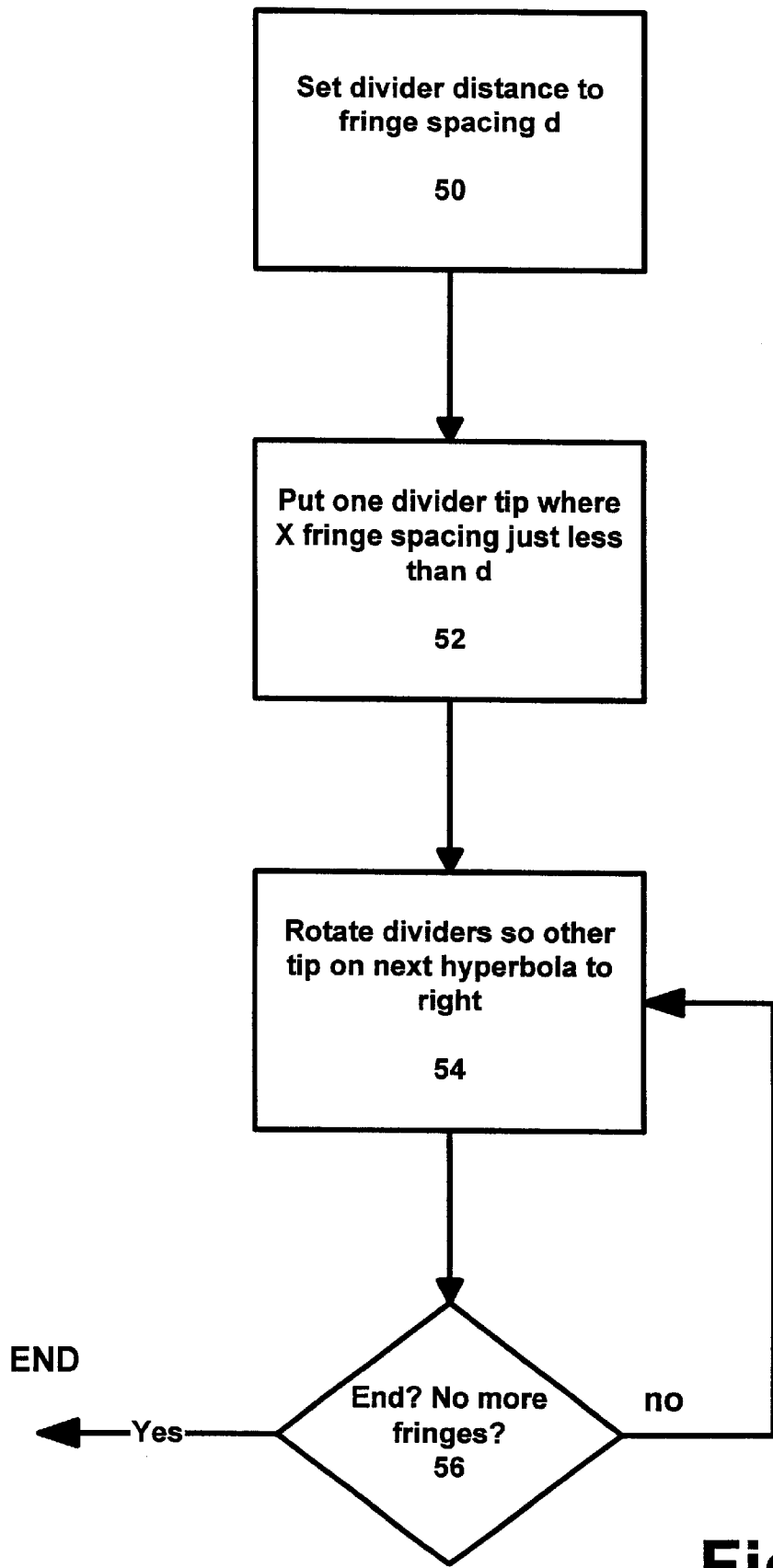
FIG. 7 depicts a block diagram of the technique used to generate the cross-sectional curve of the holographic plate.

Referring now to FIG. 7, and referring to the hyperbolae of FIG. 2a, the constant-pitch curve is generated with the help of a pair of dividers. For a particular desired fringe spacing, the distance between the divider tips is initially set to the desired fringe spacing 50 by using the X axis as a scale. Next one of the divider tips is placed on the Y-axis at a height where the lateral, or x, distance between the nearest hyperbolae is a little less than the selected fringe spacing 52. Now, keeping the first point of the dividers where it is, the dividers are rotated so that the other tip falls on the next hyperbola to the right 54. There are two possible intersection points: the one closer to the X-axis is selected. The process 56 is continued, going from one hyperbola to the next. The series of points on successive hyperbolae define the shape of the encoder curve.

It has been found to be time-saving to select a fringe spacing and wavelength that were both scaled up by the same factor (e.g. instead of an actual wavelength of 0.4416 $\mu$m and a desired encoder pitch of 10 $\mu$m, a waveleng of 44.16 $\mu$m and a fringe spacing of 1000 $\mu$m was selected). This, in effect, allows the use of every $100^{th}$ fringe and reduces the number of computations proportionately-without any significant loss in accuracy.

To extend the curve on the other side of the y-axis, that is, for negative values of x, the same process is repeated, but intersection points that are further from the x-axis are selected. This process will continue the curve without any discontinuity at the y-axis.

Figure 3:
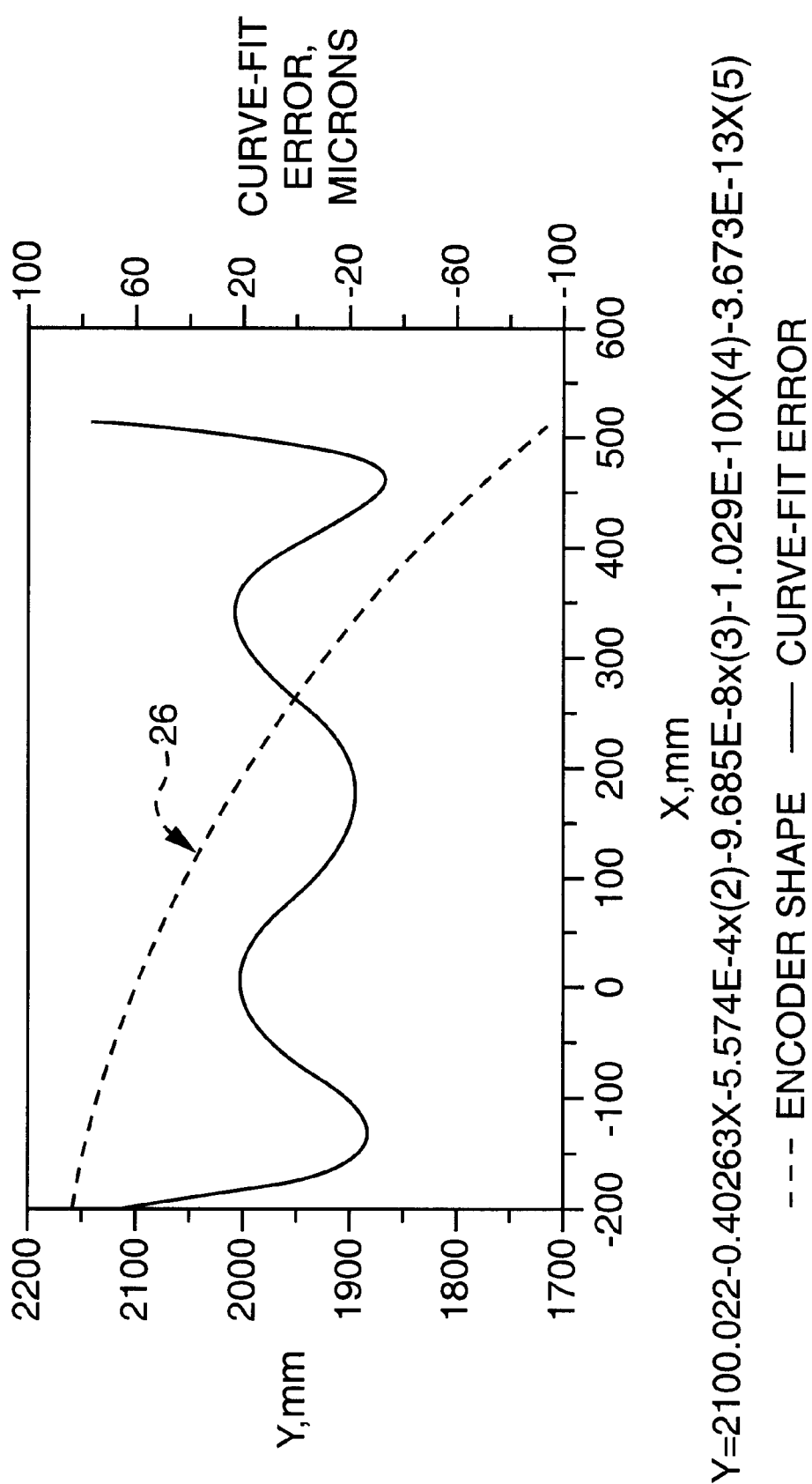
FIG. 3 depicts the Numeric Solution to the Error-Free Linear Encoder Problem as a function of displacement along the x axis, expressed as a plot of the curved holographic image plate, and also shows the residual errors of a $5^{th}$ order polynomial fit to the numerical data.

FIG. 3 shows a typical numerical solution, the curve 26 being generated by this method. The intersection of curve 26 with the Y axis (that is, at X=0, or about 2100 mm) represents the distance of a flat holographic plate from the midpoint between the point sources which would produce the hyperbolic fringes of FIG. 2b when projected upon the plate. However, when the plate has the cross-section shown in FIG. 3 the fringes will be equidistant from each other when falling on the curved plate. Note that in general the curve 26 comes to an end—at a point where the distance to the next hyperbola is greater than the selected encoder spacing. The shape of the curves so generated are also somewhat counter-intuitive in that they are not symmetric about the y-axis. It should also be noted that the technique for generating the curve of the holographic plate has been extended for negative values of X in FIG. 3.

Still referring to FIG. 3, the curve fit error is also plotted, the Y-axis scale appearing on the right-hand side of the plot. The error curve is for a $5^{th}$ power polynomial fit to the numeric solution. The figure shows that the error for X values between −175 mm to 500 mm is no greater than about 20 microns.

Making the Encoder

Figure 4:
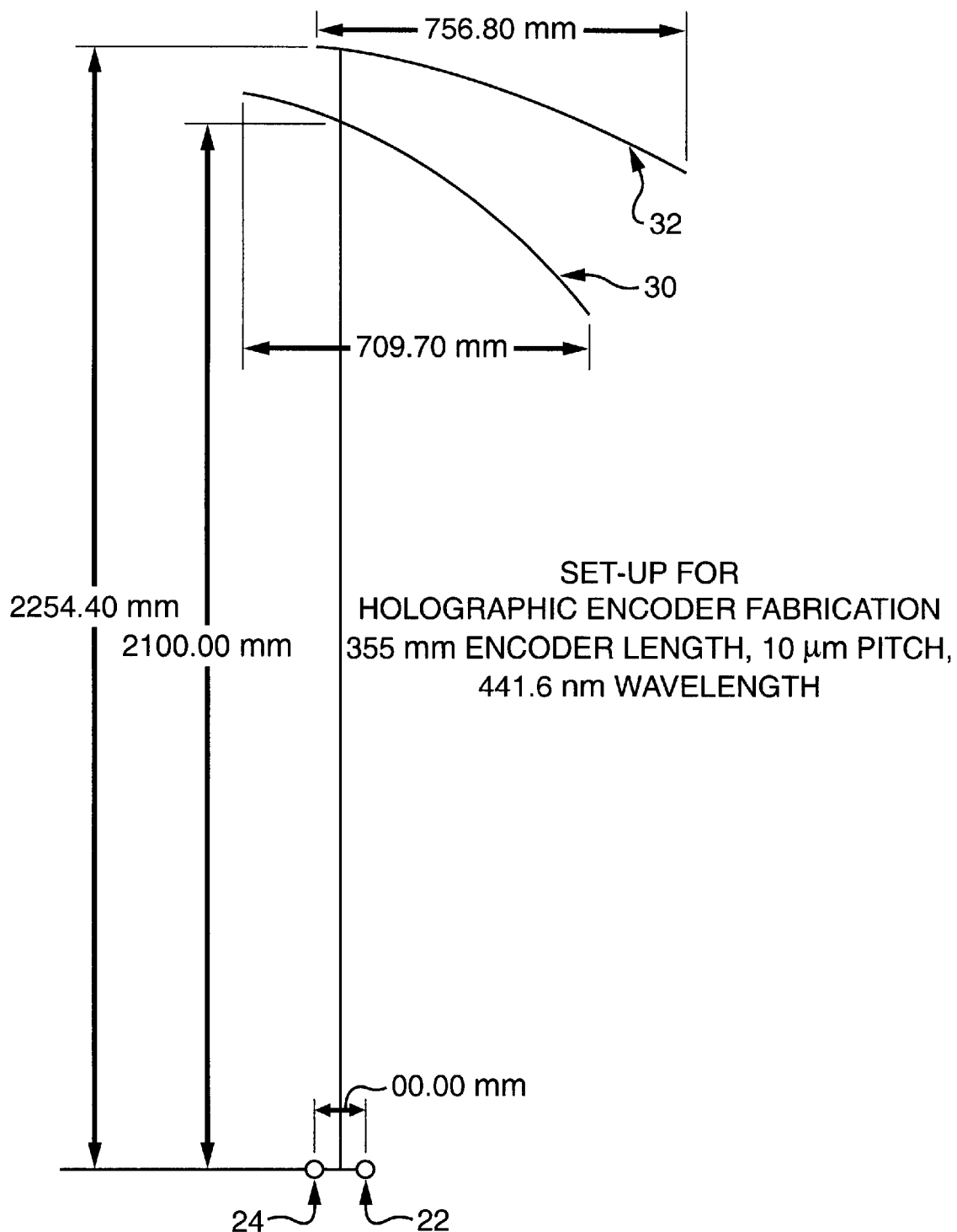
FIG. 4 depicts the geometry of the components required for holographic encoder fabrication in accordance with the present invention.

Once the shape of the curve is defined and selected as described above, it must be fabricated as a holographic plate. The method described herein is suitable for making encoders up to a meter long. For this purpose, the geometry shown in FIG. 4 is used. Referred now to FIG. 4, it is seen that point sources 22,24 are 100 mm apart and the laser wavelength used is 441.6 nm. A HeCd laser is used for this purpose. Still referring to FIG. 4, a holographic plate 30 having a constant pitch curve of a shape sufficient to produce an encoder with a pitch of 10 microns is located at a distance of 2100 mm from the a point halfway between the point sources, and normal to a place containing both point sources. The length of the plate is about 750 mm. FIG. 4 also shows a second holographic plate 32, located 2254.40 mm from the point sources, with a length of about 800 mm. Both of these plates will produce the encoder of the pitch desired, demonstrating that there is more than one solution to this problem.

Clearly two material items are required to fabricate the holographic plate: (1) a rigid and thermally stable hologram substrate that can be formed into the desired shape, and (2) a form that can be used to define the shape of the holographic plate (which will become the encoder), and which will hold the plate in place during exposure.

The form can be made in a straightforward manner from either the numeric solution to the problem, or from a polynomial best-fit to the numeric solution. Although the machining of the form should be smooth and accurate, small localized errors in the shape of the form will probably have little effect. The very nature of bending the substrate to fit the form acts very effectively to prevent errors of high-spatial frequency (the substrate simply won't follow such errors). The thickness of the substrate will be selected on the basis of its yield strength, the curve to be followed, and the method used to hold the substrate in place on the form. A convex form appears preferable, since a flexible holographic plate can be easily held and bent to fit the convex form. Glasses are readily available in thickness that will allow them to be easily bent into the shapes that are needed.

Once the curved holographic plate is properly aligned with respect to the point sources, and the interference fringes created on the holographic plate, the plate must then be processed to produce grooves, or rulings, in the plate where the interference fringes exposed photosensitive material on the face of the plate. In actual practice, the flexible glass plate is coated first with chromium and then with photoresist. The photo-resist is then exposed to the fringes, and processed to remove the photoresist in the exposed areas (or alternatively, the unexposed areas, depending upon the type of photoresist used.) The plate is then immersed in an etchant which removes the chromium where the photo-resist was removed. Finally the plate is further processed to remove the residual photoresist. This is a very common protocol and is the standard practice used in making masks for semiconductor lithography.

Once the hologram is exposed and processed to give the desired groove profile, the curved holographic plate is flattened. This plate then becomes a master, and used in the manufacture of replicas—which can be on thicker glass or metal. The material chosen should be one which does not change its dimensions with variations in temperature. Low-expansion glass, low-expansion metal, iron-nickel alloy, and fused silica are common materials used for this purpose. Fused silica, Zerodur and Invar are the preferred choices for the replicas when thermal stability is an issue.

This process has been used to make a test encoder against a circular form. The circular form does not, of course, produce a constant pitch over the length of the encoder, but it provided means to validate the feasibility of the fabrication concept. The resultant encoder had exactly the pitch errors predicted by modeling.

CONTROLLING THE GROOVE PROFILE

Figure 5:
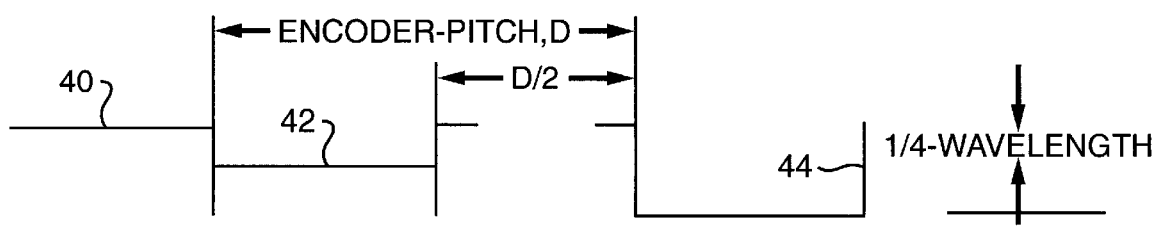
FIG. 5 depicts a cross section of a portion of the encoder, showing the pitch and ideal height of the grooves produced by the method.

The specific goal is the manufacture of an encoder to be used in reflection. Although an encoder with alternating stripes of reflective and non-reflective material will work, the most efficient approach, in terms of the amount of light available to the encoder sensor, is an all reflective encoder with a stepped profile. Ideally, when the encoder is illuminated normally by a small diameter beam of specified wavelength, there will be no light in either the zero order or in the ±2 order-thus minimizing contamination of the ±1 orders used to make position measurements. These two requirements are met by an encoder having a 50% duty cycle and a height 44 of ¼-wavelength, as shown in FIG. 5. Still referring to this figure, it is seen that the encoder face has alternating raised 40 and depressed 42 cross sections, and that the width of each raised cross section is equal to the width of the depressed cross section, or groove. In addition, the distance from the low point to the high point of the profile is one- quarter wavelength. There are a variety of ways to manufacture this profile—through a combination of substrate preparation, exposure control, and post-exposure processing.

While the invention has been described with reference to specific embodiments, it will be apparent that improvements and modifications may be made within the purview of the invention without departing from the scope of the invention defined in the appended claims.

I claim:

1. A method for making a encoder, comprising the following steps, in order:
    (a) generating a mathematical representation of the family of hyperbolic fringes which appear on a plane located a distance d from the midpoint of two coherent point sources a distance p from each other, said representation having an X axis and a Y axis;
    (b) calculating a apparently constant-pitch curve in said plane of a desired size on which the hyperbolic fringes appear equidistant, the curve intersecting a line normal to the plane containing the point sources and midway between the point sources at a distance d from said midpoint;
    (c) fabricating a holographic plate into a semicylindrical shape, having a superior and inferior side, the inferior side having the shape of the apparently constant-pitch curve;

(d) coating the holographic plate with photosensitive material;
(e) disposing the semicylindrical plate the distance, d, from two coherent point sources with the inferior side facing the two coherent point sources, the axis of the semicylindrical holographic plate perpendicular to a line connecting the two coherent point sources so that interference fringes from the two coherent point sources will appear equidistant on the inferior side of the semicylindrical holographic plate,
(f) illuminating the holographic plate with the interference fringes produced by the point sources;
(g) processing the holographic plate to produce grooves in the plate corresponding to the fringes; and
(h) flattening the holographic plate.

2. The method of claim 1, wherein the calculating of the constant-pitch curve further comprises the following steps, in the order indicated:

(a) establishing a desired fringe spacing d;
(b) selecting a point f0 on the Y axis where the distance between the fringes, when projected onto the X axis, is a small amount less than d;
(c) selecting a point on the next adjacent fringe fn such that the distance fn−f0 is equal to d.
(d) selecting a point on the next adjacent fringe, fn+1, such that the distance, fn+1−fn, is equal to d.
(e) repeating step (d), until either the curve is the desired size, or until there are no more fringes on which to repeat the process.

3. The method of claim 2, wherein the holographic plate is made from glass.

4. The method of claim 3, wherein the holographic plate is a master plate, and further comprising fabricating replicas from the master plate by means of replication.

5. The method of claim 4, wherein the replicas are fabricated from the group of materials which consists of glass, metal, fused silica, and Invar.

* * * * *

UNITED STATES PATENT AND TRADEMARK OFFICE
CERTIFICATE OF CORRECTION

PATENT NO. : 6,413,702 B1
DATED : July 2, 2002
INVENTOR(S) : Michael Hercher

It is certified that error appears in the above-identified patent and that said Letters Patent is hereby corrected as shown below:

Column 1,
Line 2, should read:
-- This invention was made with Government support under Contract DAAH01-99-C-R080 awarded by the U.S. Army Aviation and Missile Command. The Government has certain rights in the invention. --.

Signed and Sealed this

Twentieth Day of December, 2005

JON W. DUDAS
*Director of the United States Patent and Trademark Office*